(12) United States Patent
Griffin et al.

(10) Patent No.: US 6,467,404 B1
(45) Date of Patent: Oct. 22, 2002

(54) HOT STAMP MACHINE FOR CUSTOM IMPRINTING PLASTIC IDENTIFIER TAGS

(75) Inventors: Todd Griffin; Charles Backula; Dennis Apana, all of Temple, TX (US)

(73) Assignee: Temple Tag, Inc., Temple, TX (US)

( * ) Notice: Subject to any disclaimer, the term of this patent is extended or adjusted under 35 U.S.C. 154(b) by 0 days.

(21) Appl. No.: 09/649,642

(22) Filed: Aug. 28, 2000

(51) Int. Cl.⁷ .................................................. B41J 1/60
(52) U.S. Cl. .......................................... 101/21; 101/27
(58) Field of Search .............................. 101/7, 8, 9, 16, 101/18, 21, 22, 25, 27, 29; 400/708

(56) References Cited

U.S. PATENT DOCUMENTS

| | | | | |
|---|---|---|---|---|
| 3,774,529 A | * | 11/1973 | Filsinger et al. | 101/27 |
| 4,044,665 A | * | 8/1977 | Kuhne et al. | 101/21 |
| 4,194,944 A | * | 3/1980 | Spatle | 156/540 |
| 4,313,376 A | * | 2/1982 | Swope et al. | 101/27 |
| 6,149,326 A | * | 11/2000 | Groswith et al. | 400/249 |
| 6,247,774 B1 | * | 6/2001 | Mueller | 347/2 |

* cited by examiner

Primary Examiner—Ren Yan
Assistant Examiner—Kevin D. Williams
(74) Attorney, Agent, or Firm—David G. Henry

(57) ABSTRACT

The invention is of an improved hot stamp machine for custom imprinting plastic tag blanks with selectable indicia. The machine, because of its mechanical configuration, facilitates stamping operations which are virtually devoid of any risk of injury to the user. The hot stamp machine of the present invention is configured such that a plastic tag blank is inserted through a small aperture (not substantially larger than is necessary to admit the plastic tag blank there through), and with the tag blank fully in position for stamping, the stamping operation automatically occurs within the machine, with the dangerous stamping mechanism being safely out of reach of the user.

1 Claim, 5 Drawing Sheets

HOT STAMP MACHINE FOR CUSTOM IMPRINTING PLASTIC IDENTIFIER TAGS

BACKGROUND OF THE INVENTION

1. Field of the Invention

The present invention relates to machines used in the process of thermally transferring images onto plastic identifier tags, such as ear tags used for cattle identification.

2. Background Information

Custom-imprinted plastic tags are used in a variety of contexts to identify and/or track items or commodities. This is particularly true in the cattle industry where plastic "ear tags" are used to distinguish cattle of one herd or group from those of others. Merely differentiating the colors of plastic ear tags is not sufficient to adequately identify ownership of cattle, in part, because there are insufficient tag colors available to provide unique identifiers for each owner's cattle, even, for example, in the context of one, large cattle handling facility. Therefore, uniquely identifying indicia (numerals, letters, and/or logos) are printed on plastic tag blanks.

The most cost-effective process for printing plastic ear tag blanks involves "hot stamping" images through the use of thermal film ("hot stamp foil"). When a sufficiently heated stamp block exhibiting a raised character (a numeral or letter, for example) is pressed against a tag blank with a segment of hot stamp foil positioned there between, the thermal "ink" from the hot stamp foil which overlies the raised character on the stamp block is transferred to and thermally welded onto the plastic tag blank.

To achieve consistently acceptable results in hot stamping plastic tag blanks, the mechanisms involved must effect a substantial compression between the heated stamp block(s) and plastic tag blanks (with the properly positioned, intervening hot stamp foil). Also, the stamp blocks are heated to a temperature such that contact between a user's skin and the heated stamp blocks would cause immediate burn injury. A worst-case scenario involves an operator having a hand, for example, caught in the stamping mechanism such that the hand is crushed between the very hot stamp blocks and the mechanism which presses the tag blanks against the stamp blocks. Such dangers are very real with machines of the present art, because the stamping area of such machines are readily accessible because of their mechanical configuration.

In an attempt to minimize the dangers of using hot stamp machines, as is true of many industrial machines, double-hand safety switch systems and/or optical "light gates" are typically installed to govern actuation of the machines such that the machines may not be actuated for a stamping operation unless the operator has each of his or her hands on both of the switching members, or (in the case of light gates) not extending past a predetermined point, which, therefore, is supposed to mean that the operator's hands are clear of the stamping mechanism.

Perhaps, to the surprise of most but industrial safety engineers who encounter such problems on a regular basis, even such measures as a double-hand safety systems and light gates do not adequately prevent injuries from machines such as hot stamp machines. Workers are known to disable or "fool" such safety systems to speed their work or reduce the "hassle" of moving so far from the position of their repetitious hand work. Also, merely insuring that one person has two hands on the appropriate safety switches does not ensure that other workers have their hands in safe positions relative to the dangerous mechanisms.

In part, because of the substantial risk of manufacturer's and distributor's liability issues, the presently available hot stamp machines are even less suitable for on-site use by end users (cattle owners or feed lot owners, for example) than they are for in-house factory or distributor use. Therefore, tags which would be much more readily available to serve immediate needs, if only hot stamp machines were available in the field, must be ordered from distant factories or tag distributors. This is unduly time-consuming and frustrating to end users of custom imprinted plastic tags.

It would well serve the custom imprinted plastic tag industry and its end users to provide an improved hot stamp machine which, because of its mechanical configuration, would render injury by the stamping mechanism of the hot stamp machine virtually impossible during normal use. An example of such a machine would be one having a simple aperture no larger than is necessary to admit a tag blank there through. To imprint a plastic tag blank, one would merely pass the blank through the aperture and the appropriate indicia is automatically stamped thereon. Thereafter, the printed tag is ejected from the machine. Such a machine would eliminate the need (as exists through use of presently available hot stamp machines) to manually place a tag blank in position for stamping and thereby place a user's hands and fingers directly in position for possible catastrophic injury.

Because of the substantially improved safety margin involved in using such an improved hot stamp machine, such machines could be placed in the field for end users and thereby facilitate the immediate availability of custom imprinted plastic tags for such end users. In addition, such machines could be used to replace the dangerous, existing hot stamp machines at factories and distributor facilities to reduce the risk of injury to even experienced workers.

SUMMARY OF THE INVENTION

It is an object of the present invention to provide an improved hot stamp machine.

It is another object of the present invention to provide an improved hot stamp machine which poses less danger to users than presently available such machines.

It is another object of the present invention to provide an improved hot stamp machine which, is more suitable for end user use than presently available hot stamp machines which are suitable only for factory or tag distributor in-house use.

It is another object of the present invention to provide an improved hot stamp machine which exhibits a small aperture through which tag blanks are inserted for automatic imprinting but, because of the dimensions of the aperture, user's fingers cannot accidentally reach the stamping mechanism for possible injury.

In satisfaction of these and related objectives, the present invention provides an improved hot stamp machine which, because of its mechanical configuration, facilitates stamping operations which are virtually devoid of any risk of injury to the user. The hot stamp machine of the present invention is configured such that a plastic tag blank is inserted through a small aperture (not substantially larger than is necessary to admit the plastic tag blank there through), and with the tag blank fully in position for stamping, the stamping operation automatically occurs within the machine, with the dangerous stamping mechanism being safely out of reach of the user.

Because of the safety features inherent in the machine of the present invention, a hot stamp machine according to the present invention is suitable for end user placement with minimal exposure of liability for injury for the manufacturer or distributor. Plastic tag distributors will be at a competitive advantage if they are able to provide their customers with such machines and thereby facilitate immediate availability of custom imprinted tags on an as needed basis.

DETAILED DESCRIPTION OF THE PREFERRED EMBODIMENT

Figure 1:
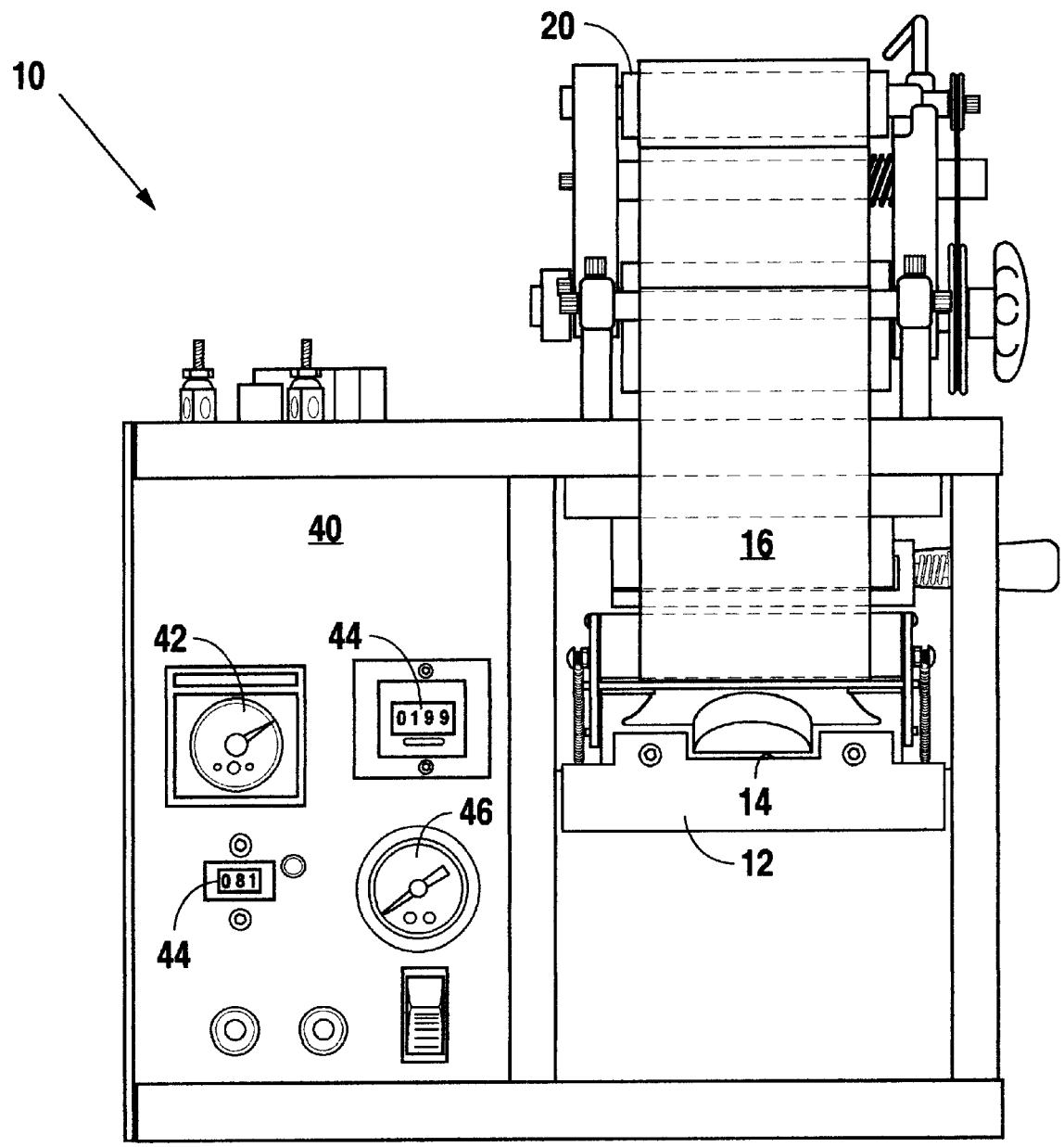
FIG. 1 is a front elevational view of the preferred embodiment of the present hot stamp machine invention.

Referring to FIG. 1, the hot stamp machine of the present invention is identified generally by the reference numeral 10. Hot stamp machine 10 includes an aperture plate 12 which defines an aperture 14 through which tag blanks (not shown in the figures) are inserted for stamping. As discussed in the background section, the fundamental improvement of the present hot stamp machine 10 stems from the ability to simply insert the tag blanks through aperture 14 (much like inserting a bank teller machine card into an ATM) and complete the stamping process with no possible exposure to hazards to the user, and without the necessity for engaging hands free safety actuation devices; the latter safety devices being absolutely necessary for safety purposes with machines of the prior art.

Because of the dimensions of aperture 14 (not substantially larger than is necessary to admit a tag blank there through), it would be virtually impossible for any user, during normal use of the machine 10, to accidentally suffer injury through mechanical crushing or burns at the stamping mechanism position. Only when stamp blocks (to be discussed later) are replaced for changing the imprinted indicia does any possible danger exist for the user. However, following commonsense safety guidelines should alleviate this latter danger as well.

Figure 2:
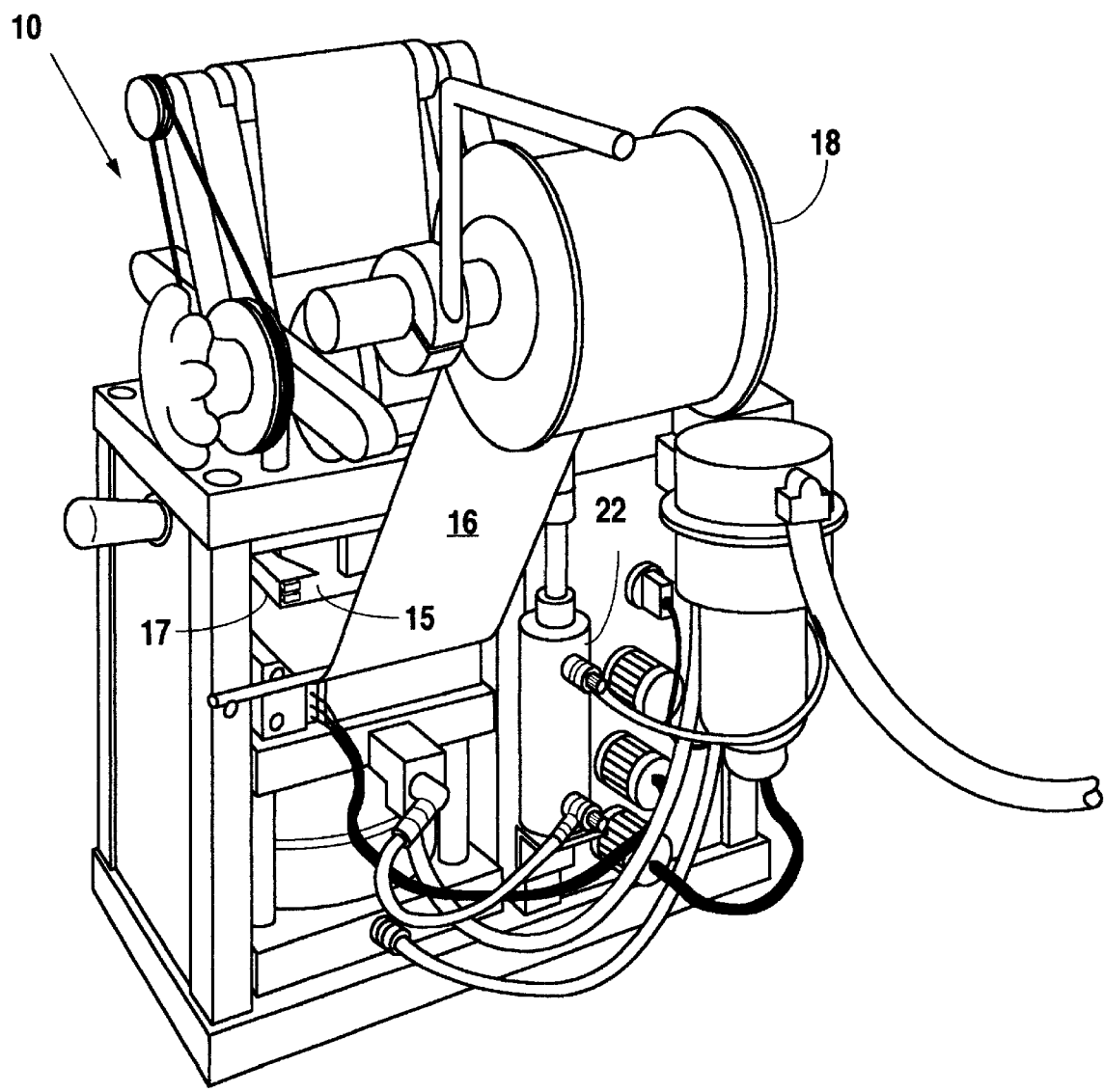
FIG. 2 is a rear perspective view of the preferred embodiment with exterior casing removed to expose internal components.

Referring principally to FIG. 2, a tag guide 15 is provided and aligned with aperture 14 to properly guide and align a tag blank for proper positioning during the stamping operation. At the rear of tag guide 15 is positioned a sensor which detects when a tag blank is fully positioned for an imprinting cycle. This sensor is, through conventional circuitry, connected to an actuation circuit for hot stamp machine 10 whereby an imprinting cycle is initiated when a tag blank is so positioned. Such an actuation will move hereafter described components in such a manner that a tag blank is automatically imprinted with indicia for which hot stamp machine has been configured.

Referring principally to FIGS. 1,2,4, and 5, hot stamp machine 10 includes hot stamp "foil" 16 which initially is dispensed from a source roll 18. Hot stamp machine 10 includes a feeder system which, as hot stamp machine 10 is actuated, appropriately advances hot stamp foil 16 for applying a fresh segment of stamp foil 16 to a tag blank, and thereafter advances the used foil segment onto a take-up roller 20.

Figure 4:
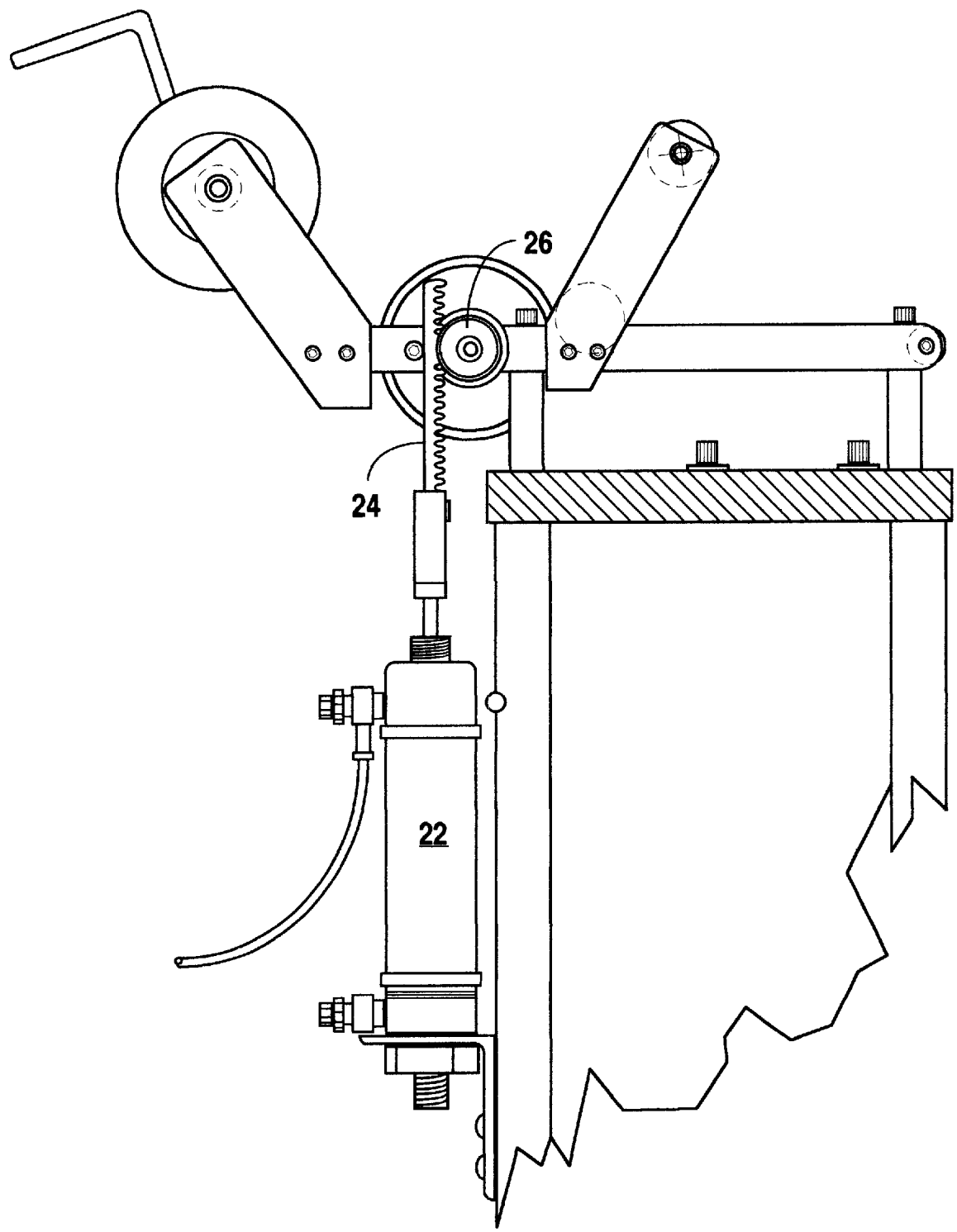
FIG. 4 is a side elevational view of the pneumatically driven rack and pinion advanced mechanism for the hot stamp foil feeder system of the preferred embodiment.
Figure 5:
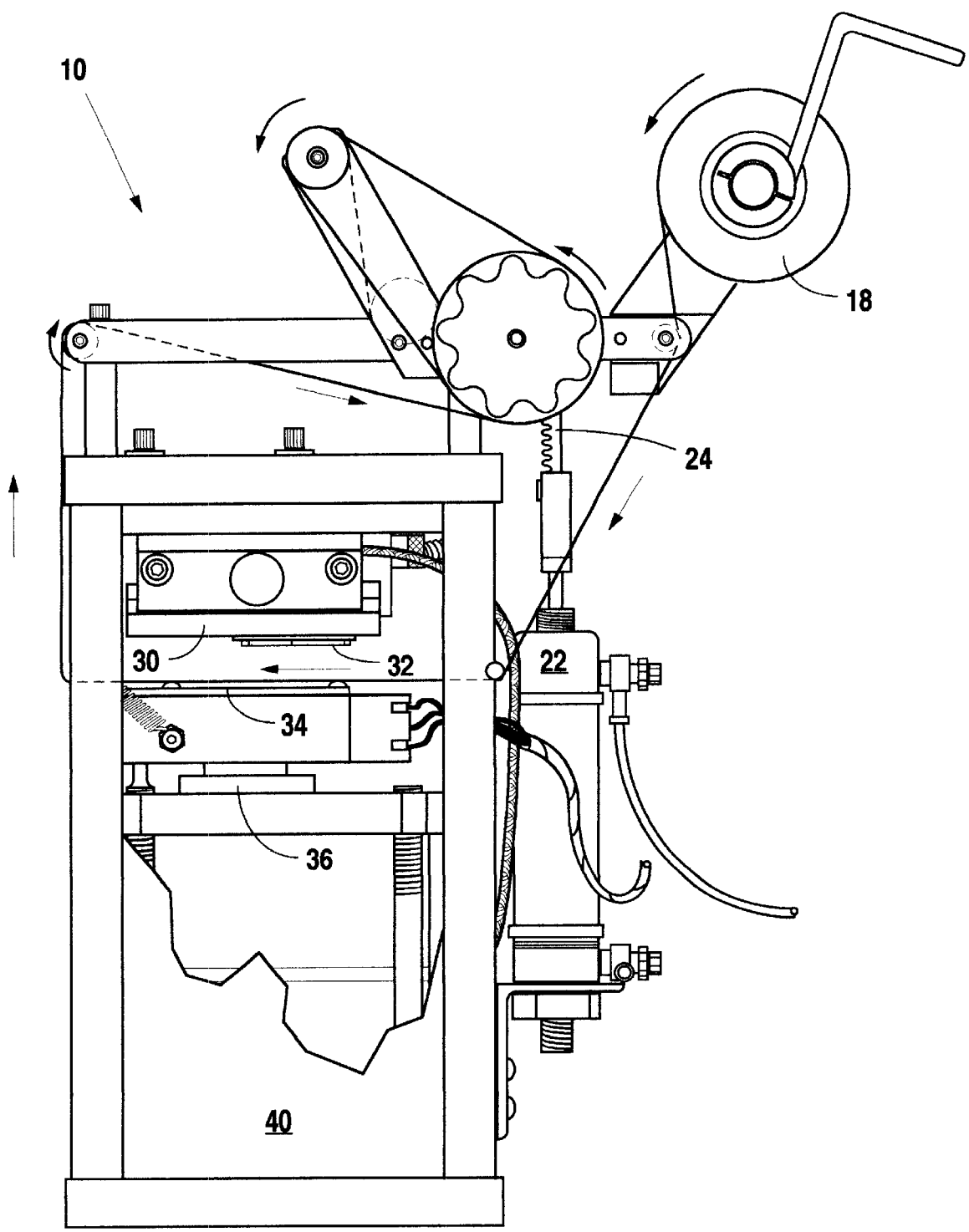
FIG. 5 is a side elevational view of the hot stamp machine of the present invention with a portion of the outer casing cut away for exposing internal components.

Referring principally to FIGS. 4 and 5, through appropriate switching and circuitry as would be readily apparent and assembled by anyone reasonably skilled in the electromechanical arts, a pneumatic cylinder 22 advances a rack 24 which rotates a pinion 26 which, in turn, advances the other components of the hot stamp foil feeder system such that hot stamp foil 16 is appropriately advanced as previously described.

Figure 3:
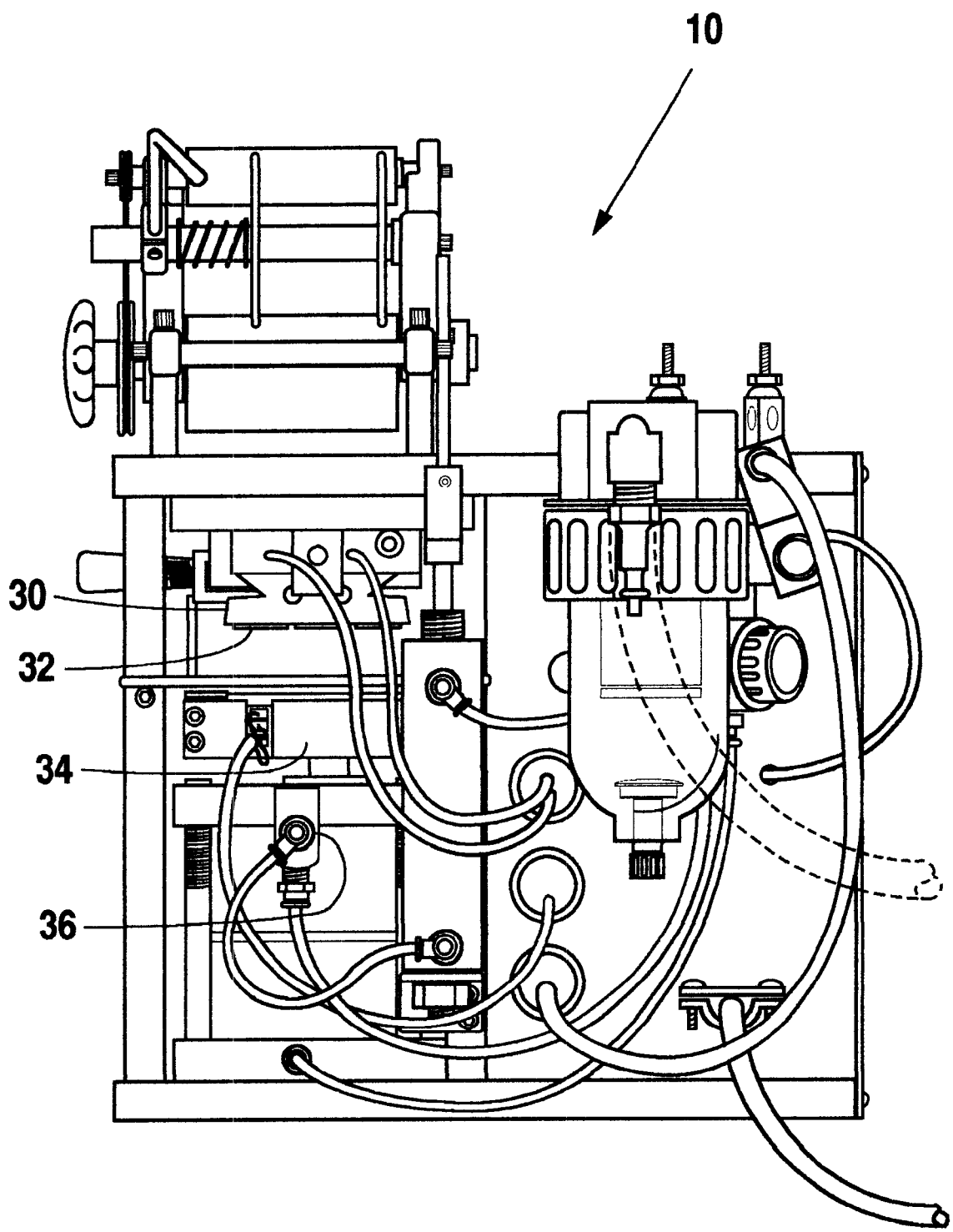
FIG. 3 is a rear elevational view of the preferred embodiment.

Referring principally in combination to FIGS. 3 and 5, the stamping mechanism of the hot stamp machine 10 principally comprises the stamp block holder/heater 30. Stamp block holder/heater 30 is electrically heated such that stamp blocks 32 are at an appropriate temperature to thermally transfer the thermal "ink" of hot stamp foil 16 onto tag blanks according to conventional use of such hot stamp foil 16 when stamp blocks 32 are pressed against a plastic tag blank with intervening hot stamp foil 16.

Stamp block holder/heater 30 holds stamp blocks 32 in position for contacting tag blanks (not shown in the drawings) with a segment of hot stamp foil 16 there between, whereupon the raised indicia on the stamp blocks 32 is replicated onto the tag blank as the thermal ink is pressed onto and thermally welded into the surface of the plastic tag blank.

The mechanical action required to press a tag blank against the stamp blocks 32 to achieve the actual transfer of image is accomplished in the present hot stamp machine 10 through action of a ram plate 34. Ram plate 34 rests atop a pneumatic cylinder assembly 36 which, when actuated, raises ram plate 34 to a point where the tag blank situated within tag blank guide 15 is forcibly, momentarily compressed against stamp blocks 32 which reside in stamp block holder/heater 30. A fresh segment of hot stamp foil 16 lies between ram plate 34 and stamp blocks 32 by virtue of the relative positioning of the tag blank guide 15, the path of the hot stamp foil 16 through hot stamp machine 10, the stamp block holder/heater 30, and the ram plate 34.

After a predetermined imprinting cycle time, air pressure to pneumatic cylinder assembly 36 is reversed and ram plate 34 retreats to its lowered, retracted position (as shown in the figures). As previously mentioned, actuation of the feeder system for the hot stamp foil 16 is coordinated with actuation of the stamping mechanism such that, at the end of the imprinting cycle time, a new segment of hot stamp foil 16 is advanced to the stamping mechanism area for the next imprinting cycle. Because of the routing of the hot stamp foil 16 through hot stamp machine 10, and because tag blanks tend to gently stick to hot stamp foil 16 after imprinting, the advancing hot stamp foil 16 ejects the printed tag back through aperture 14 as the advancing hot stamp foil 16, to which the printed tag is loosely attached, carries it in that direction.

The pneumatic and electrical systems of the hot stamp machine of the present invention are of conventional design and need not be described in detail here to provide an enabling disclosure.

Referring again principally to FIG. 1, the hot stamp machine 10 of the preferred embodiment is encased with an outer casing 40 which restricts access to the stamping mechanism area inside the machine 10 except when such area is accessed to change stamp blocks 32. The preferred embodiment of the present stamp machine 10 also includes such items of convenience has stamp block holder/heater temperature indicator 42, a pneumatic pressure meter 46 and one or more counters 44 for counting the number of tags printed in a single batch and/or the number of tags printed on a machine over the course of its life or use at a particular location.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An improved hot stamp machine for custom imprinting plastic tags with indicia through use of thermal film comprising:

indicia imprinting means with raised indicia positioned on a face surface thereof;

means for heating said indicia imprinting means to a temperature sufficient to thermally transfer thermal ink from a segment of thermal ink film to a plastic tag blank; ram means for reversibly pressing a plastic tag blank against said indicia imprinting means and effecting said transfer;

thermal ink film feeder means for routing said thermal ink film between said indicia imprinting means and said ram means, whereby, when said ram means moves to press a tag blank against said indicia imprinting means, a first segment of said thermal ink film is positioned for transferring said indicia onto the plastic tag blank, said thermal ink film feeder means being further configured for, at the conclusion of an actuation of said ram means for an imprinting cycle, advancing a length of said thermal ink film of which said first segment is a part, whereby a second, unused segment of said thermal ink film becomes positioned for a subsequent imprinting cycle;

a tag blank aperture plate positioned on an outer casing of said hot stamp machine, at least portions of said outer casing surrounding said aperture for shielding internal components of said machine from a user's hands or fingers, and said tag blank aperture plate having an aperture sized and shaped for admitting a plastic tag blank into said hot stamp machine for said imprinting cycle, but being of a size whereby a user's fingers may not pass there through, said tag blank aperture plate being positioned relative to a tag blank guide member whereby, when a tag blank is passed through said aperture into said hot stamp machine, the tag blank is positioned for said imprinting cycle; and sensor means for sensing when a tag blank is properly positioned for said imprinting cycle and at such time actuating said ram means for transferring said indicia onto the tag blank.

* * * * *